United States Patent [19]

Rege et al.

[11] Patent Number: 5,440,690
[45] Date of Patent: Aug. 8, 1995

[54] NETWORK ADAPTER FOR INTERRUPTING HOST COMPUTER SYSTEM IN THE EVENT THE HOST DEVICE DRIVER IS IN BOTH TRANSMIT AND RECEIVE SLEEP STATES

[75] Inventors: Satish L. Rege, Groton; Andrew P. Russo, Hyde Park, both of Mass.

[73] Assignee: Digital Equipment Corporation, Maynard, Mass.

[21] Appl. No.: 225,367

[22] Filed: Apr. 8, 1994

Related U.S. Application Data

[63] Continuation of Ser. No. 815,001, Dec. 27, 1991, abandoned.

[51] Int. Cl.⁶ .............................................. G06F 13/00
[52] U.S. Cl. ................... 395/200.02; 395/250; 395/200.1; 395/200.2; 395/822; 364/222.2; 364/239.6; 364/284.4; 364/DIG. 1; 370/85.13
[58] Field of Search ................ 370/84, 56, 60, 85.2, 370/112, 58.2, 58.5, 85.13, 85.14, 85.5; 395/275; 364/222.2, 239.6, 284.4

[56] References Cited

U.S. PATENT DOCUMENTS

| | | | |
|---|---|---|---|
| 4,449,182 | 5/1984 | Rubinson et al. | 364/200 |
| 4,535,420 | 8/1985 | Fung | 364/900 |
| 4,635,191 | 1/1987 | Boning | 364/200 |
| 4,675,865 | 6/1987 | DeVries et al. | 370/85.1 |
| 4,754,399 | 6/1988 | Yamamoto et al. | 364/200 |
| 4,956,771 | 9/1990 | Neustaedter | 364/200 |
| 4,995,056 | 12/1990 | Fogg, Jr. et al. | 375/7 |
| 5,020,020 | 5/1991 | Pomfret et al. | 364/900 |
| 5,043,981 | 8/1991 | Firoozmand et al. | 370/85.15 |
| 5,136,582 | 8/1992 | Firoozmand | 370/85.1 |
| 5,161,215 | 11/1992 | Kouda et al. | 395/250 |
| 5,163,132 | 11/1992 | DuLac et al. | 395/275 |
| 5,193,149 | 3/1993 | Awiszio et al. | 395/200 |
| 5,210,749 | 5/1993 | Firoozmand | 370/85.1 |
| 5,247,626 | 9/1993 | Firoozmand | 395/250 |
| 5,295,246 | 3/1994 | Bischoff et al. | 395/250 |
| 5,319,754 | 6/1994 | Meinecke et al. | 395/325 |

FOREIGN PATENT DOCUMENTS

0267974A1 11/1986 European Pat. Off. .
0425764A2 7/1990 European Pat. Off. .

OTHER PUBLICATIONS

1982, Stone, H. S., Addison-Wesley Series in Electrical Engineering, *Microcomputer Interfacing*, pp. 18, 19.
Satish Rege, *The Architecture and Implementation of a High-Performance FDDI Adapter*, Digital Technical Journal, vol. 3, No. 3, Summer 1991, pp. 48–77.

*Primary Examiner*—Thomas C. Lee
*Assistant Examiner*—Moustafa M. Meky
*Attorney, Agent, or Firm*—David A. Dagg; A. Sidney Johnston

[57] ABSTRACT

A network adapter with an interrupt generation circuit to minimize the number of host computer system interrupts needed to notify the host computer system that the network adapter has consumed one or more host memory buffers. The interrupt generation circuit issues an interrupt to the host computer system when the host computer system has entered both a transmit sleep state and a receive sleep state, and the network adapter has consumed a host memory buffer not processed by the host computer system. When the host computer system has no work to do with respect to transmit buffers in the host computer memory, it enters a transmit sleep state and indicates to the network adapter the last transmit buffer it processed. When the host computer system has no work to do with respect to receive buffers in the host computer memory, it enters a receive sleep state and indicates to the network adapter the last receive buffer it processed. If subsequent to both these indications, the network adapter consumes a host memory buffer that the host computer system has not processed, the interrupt generation circuit issues an interrupt to the host computer system. The network adapter further includes means for the host computer system to notify the network adapter that the host computer has produced multiple host memory buffers for the network adapter to consume.

18 Claims, 6 Drawing Sheets

NETWORK ADAPTER FOR INTERRUPTING HOST COMPUTER SYSTEM IN THE EVENT THE HOST DEVICE DRIVER IS IN BOTH TRANSMIT AND RECEIVE SLEEP STATES

This application is a continuation of application Ser. No. 07/815,001, filed Dec. 27, 1991, now abandoned.

FIELD OF THE INVENTION

This invention relates to communications between a network adapter and a host computer, and more particularly to an efficient interface protocol minimizing the number of host computer interrupts generated by the network adapter.

BACKGROUND INFORMATION

Network Adapters

In computer networks a host computer system is normally connected to the network by a network adapter. In some designs, the network adapter is a board that plugs into the backplane bus of the host computer system. In other designs, the network adapter is built into the CPU motherboard. The host computer system typically includes a device driver which operates the network adapter.

Computer networks transfer data from one network node to another in the form of packets. For the purposes here, packets may include information for all layers of the ISO/OSI model at and above the data link layer. The network adapter transmits packets from the host computer system onto the network, and delivers packets from the network to the host computer system.

Producer/Consumer Model and Notification

During operation, the host computer system produces two types of host memory buffers that are consumed by the network adapter: (1) transmit buffers containing packets to be transmitted onto the network, and (2) receive buffers to hold packets received from the network. The host computer system notifies the network adapter when either type of host memory buffer is produced. Similarly, the network adapter notifies the host computer system when it finishes consuming either type of buffer.

For example, to transmit a packet onto the network, the host computer system produces a transmit buffer by allocating a host memory buffer from a free pool of memory buffers, and writing the packet to the host memory buffer. The host computer system then notifies the network adapter that the transmit buffer has been produced (the packet is ready for transmission). The network adapter consumes the transmit buffer by transmitting the packet onto the network. The network adapter then notifies the host computer system that the buffer has been consumed (transmission has completed). To receive a packet from the network, the host computer system first produces a receive buffer by allocating a host memory buffer into which a packet from the network may be received. The host computer system then notifies the network adapter that the receive buffer has been produced. When the network adapter subsequently receives a packet from the network to be stored in host memory, it consumes the receive buffer by writing the packet to it. The network adapter then notifies the host that the receive buffer has been consumed (the packet has been received).

When the host computer system is notified that a host memory buffer has been consumed (either a transmit buffer or a receive buffer), it completes the processing of that host memory buffer. The host computer system completes processing a consumed transmit buffer by returning the transmit buffer to the free pool of host memory buffers. The host computer system completes processing a consumed receive memory buffer by delivering the received packet to the appropriate user process, and then returning the receive buffer to the free pool of host memory buffers.

The host computer system typically notifies the network adapter after each host memory buffer has been produced by writing a register on the network adapter. The network adapter typically notifies the host computer system after each host memory buffer has been consumed by sending an interrupt to the host processor in the host computer system.

Minimizing Notifications

In a multiprocessing host computer system, where many user processes execute on a single processor, the cost of processing interrupts from peripheral devices, such as a network adapter, is severe. Interrupt processing causes suspension of instruction execution, process context switching, and instruction execution at a relatively high priority level. All of these effects increase response time and latency experienced by the processes executing on the interrupted processor.

Performance of such a host computer system can therefore be improved by reducing the number of interrupts generated by the network adapter. One way to reduce the number of interrupts is for the host computer system to process longer bursts of data in response to a single interrupt, and for the network adapter to avoid sending unnecessary interrupts.

Moreover, network traffic is typically bursty, making it convenient to transfer data between the host computer system and the network adapter in relatively long bursts. For example, a node in a token ring network must wait for a token before it can transfer data packets on the network. As a result, there is a tendency for multiple data packets (packet trains) to be transferred on the network in a single burst.

Under these circumstances, one way in which a network adapter can avoid sending unnecessary interrupts is by sending only a single interrupt when multiple data packets can be transferred between the host computer system and the network adapter in a single burst. When the host computer system is requested to service the interrupt, it is desirable for the host system to process an entire packet train rather than a single data packet.

Unfortunately, the network adapter cannot decide whether an additional interrupt of the host system is necessary (e.g., in response to the reciept by the network adapter of an additional data packet) unless the network adapter obtains or receives information indicating how much work has been done by the host computer system. Accordingly, it is desirable to provide a network adapter which can determine whether host memory buffers that have been consumed by the network adapter have been processed by the host computer system.

It is therefore desirable to have a network adapter design which minimizes the number of interrupts issued by the network adapter to the host computer system, such that unnecessary interrupts are substantially eliminated.

SUMMARY OF THE INVENTION

The invention solves the problem of minimizing the number of interrupts issued by a network adapter to a host computer system. In accordance with principles of the invention, there is provided a network adapter, including an interrupt generation circuit. The interrupt generation circuit issues host interrupts only when the network adapter consumes a memory buffer and the device driver within the host computer system is both in a 'transmit sleep' state and a 'receive sleep' state. The logic in the interrupt generation circuit further ensures that an interrupt will always be issued whenever the host computer system enters into either sleep state, while already in the other sleep state, and having not processed all host memory buffers that have been consumed by the network adapter. In this way, the invention eliminates unnecessary interrupts to the host computer system, which negatively impact the performance of the system, while providing sufficient host interrupts to notify the host of newly consumed buffers.

Further in accordance with principles of the invention, the network adapter includes means to receive notification from the host computer system, indicating that one or more host memory buffers have been produced for the network adapter to consume. The host computer system is thus allowed to produce multiple host memory buffers, and then issue a single notification to the network adapter. The network adapter then consumes all the host memory buffers that have been produced. Providing a single notification for multiple memory buffers reduces the use of any shared resources that are part of the notification mechanism, such as the system bus, for other uses.

These and other features and advantages of the present invention will become apparent from a reading of the detailed description in conjunction with the attached drawing in which like reference numerals refer to like elements in the several views.

DETAILED DESCRIPTION

Figure 1:
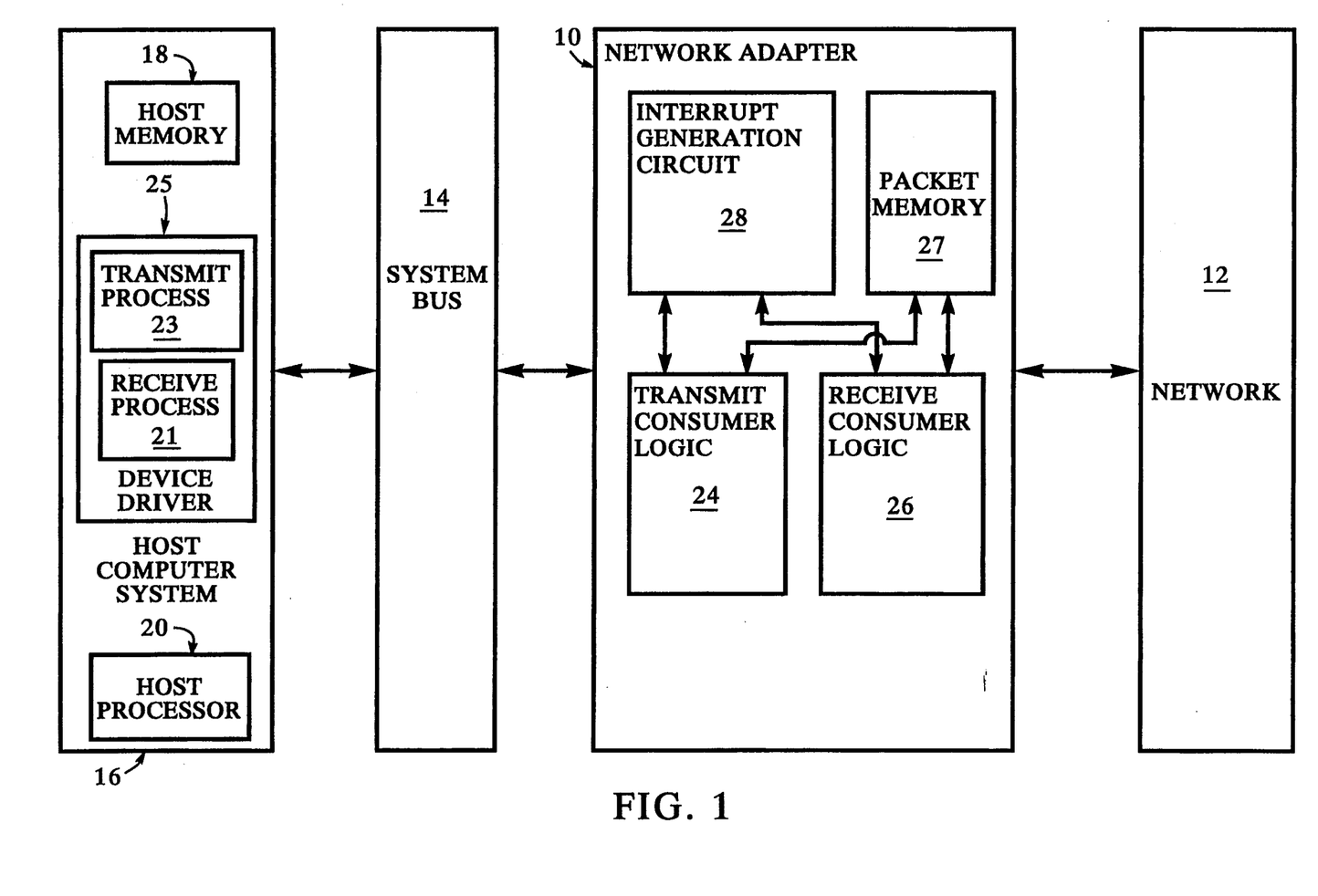
FIG. 1 is a logic diagram of a network adapter, a system bus, a host computer system, and a network.

FIG. 1 shows a network adapter 10, comprising a transmit consumer logic 24, a receive consumer logic 26, a packet memory 27, and an interrupt generation circuit 28. The receive consumer logic 26 and the transmit consumer logic 24 are coupled to the packet memory 27, and the interrupt generation circuit 28. The network adapter 10 is coupled to a network 12, and a system bus 14. A host computer system 16, comprising a host memory 18, and a host processor 20, is coupled to the system bus 14. A device driver 25, with transmit process 23 and receive process 21 is shown in the host computer system 16.

During operation, the host computer system 16 produces transmit and receive buffers in the host memory 18 for the network adapter 10 to consume. The transmit consumer logic 24 in the network adapter 10 consumes transmit buffers in the host memory 18 by moving the packets contained in the transmit buffers into the packet memory 27, to be transmitted onto the network 12. The receive consumer logic 26 in the network adapter 10 consumes receive buffers in the host memory 18 by writing packets from the packet memory 27, that have been received from the network 12, into the receive buffers. The interrupt generation logic 28 is responsive to the receive consumer logic 26, the transmit consumer logic 24, and the host computer system 16.

The device driver 25 is activated when the network adapter issues an interrupt to the host processor 20. The transmit process 23 produces, and completes the processing of transmit buffers. The receive process 21 produces, and completes the processing of receive buffers. When the transmit process 23 completes processing all transmit buffers consumed by the receive consumer logic 26, the device driver 25 enters a transmit sleep state. When the receive process completes processing all receive buffers consumed by the transmit consumer logic 24, the device driver 25 enters a receive sleep state. The device driver 25 may thus be in either the transmit sleep state or the receive sleep state, both the transmit sleep and the receive sleep state, or neither the transmit sleep state or the receive sleep state. The interrupt generation logic 28 issues an interrupt to the host processor only when the network adapter 10 has consumed a memory buffer after the device driver 21 has entered into both the transmit sleep state and the receive sleep state.

Ring Data Structures in Host Memory

Figure 2:
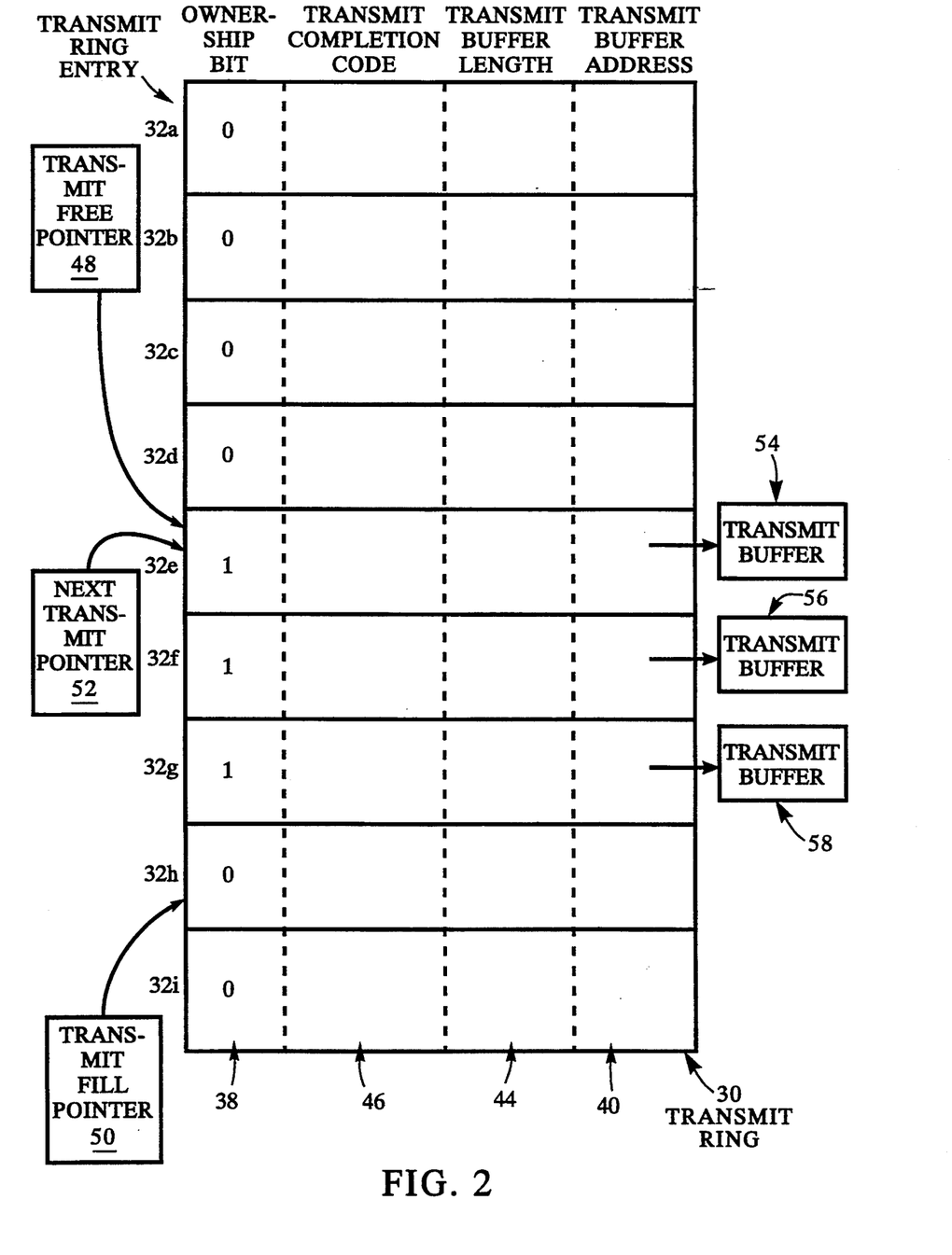
FIG. 2 is a diagram of a transmit ring in the host memory.
Figure 3:
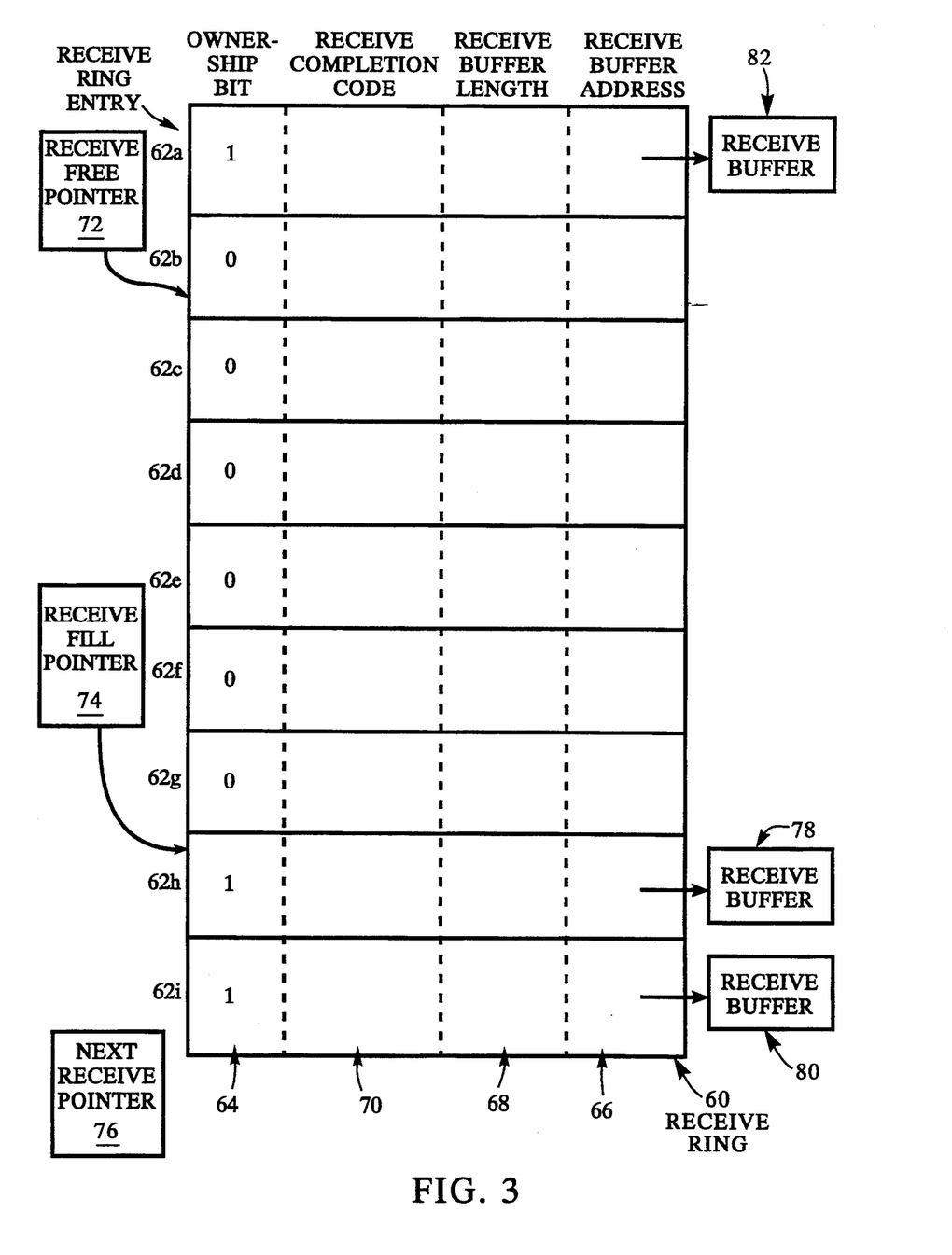
FIG. 3 is a diagram of a receive ring in the host memory.

FIGS. 2 and 3 show ring data structures in the host memory 18 (see FIG. 1), used to pass data contained in memory buffers, including packets, between the host computer system 16 and the network adapter 10. The basic protocol of ring operation common to these rings is first described. A specific example of operation for each ring is provided below.

A ring data structure consists of a fixed number of sequential ring entries. Each ring entry consists of various fields, including a memory buffer address, and an ownership bit. The value of the ownership bit indicates whether the host computer system 16 or the network adapter 10 owns the ring entry. For example, if on a particular ring, when the ownership bit is 1, the host computer system 16 owns the ring entry, then when the ownership bit is 0, the network adapter 10 owns the ring entry. In the alternative, if when the ownership bit is 1 the network adapter 10 owns the ring entry, then the host computer system owns the entry when the ownership bit is 0.

Both the owner and the non-owner may read the ownership bit in a ring entry, but only the owner my write the ownership bit. Only the owner of a ring entry may read or write any of the other fields in the ring entry, or the buffer whose address is contained in the buffer address field of the ring entry.

Rings are circular data structures. In FIG. 1 and FIG. 2, the ring entries are processed from top to bottom, and the bottom ring entry is followed in sequence by the ring entry at the top of the ring.

FIG. 2 shows the transmit ring 30, containing a fixed number of transmit ring entries 32a, 32b, ..., 32n (in this example, n= i). Each transmit ring entry 32a through 32n includes an ownership bit 38, a transmit buffer address field 40, a transmit buffer length field 44, and a transmit completion code 46. A transmit free pointer 48, and a transmit fill pointer 50, exist in the host computer system 16. A next transmit pointer register 52, exists in the transmit consumer logic 24 in the network adapter 10.

For purposes of example, the transmit free pointer 48 and the transmit fill pointer 50, in the host computer system 16, point to transmit ring entry 32e and transmit ring entry 32h, respectively. The transmit next pointer register 52 in the transmit consumer logic 24 contains the address of (or "points to") transmit ring entry 32e. Transmit ring entries with ownership bit equal to 1 (32e, 32f, and 32g), are owned by the network adapter 10. The transmit buffer address fields of these three entries contain the addresses of transmit buffers 54, 56, and 58 respectively. These transmit buffers each contain a packet to be sent by the adapter 10 onto the network 26. Those ring entries with ownership bit equal to 0 (32a, 32b, 32c, 32d, 32h, and 32i), are owned by the host computer system.

Prior to when this example begins, the host computer system 16 produced three transmit buffers, 54, 56, and 58, for the network adapter 10 to consume. The events occuring as the network adapter 10 consumes these buffers are as follows. The transmit consumer logic 24 reads the ownership bit 38 of the transmit ring entry pointed to by the transmit next pointer register 52 (transmit entry 32e), and determines the network adapter 10 owns the entry. Using the transmit buffer address field 40 and transmit buffer length field 44 to locate the transmit buffer 54 in host memory 22, the transmit consumer logic 24 moves the data from the transmit buffer 54 into the packet memory 27, for subsequent transmission onto the network 12. Upon completion of the data move, the transmit consumer logic 24 writes the transmit completion code 46 in the transmit ring entry 32e, changes the ownership of the transmit ring entry to 0, and advances the transmit next pointer register 52 to point to the next transmit ring entry in sequence (32f). Transmit ring entries 32f and 32g are then processed similarly. After transmit ring entries 32f and 32g have been processed, the next transmit pointer register 52 points to transmit ring entry 32h.

To produce another transmit buffer, the host computer system 16 uses the transmit ring entry pointed to by the transmit fill pointer 50 (ring entry 32h). The host computer system 16 first writes the transmit buffer address field 40, and the transmit buffer length field 44 of the transmit entry 32h, with the address and length of the transmit buffer containing the packet to be transmitted. The host computer system 16 then changes the ownership bit 38 of transmit ring entry 32h to 1. The transmit consumer logic 24 reads the ownership bit 30 of the transmit ring entry 32h, detects the network adapter 10 owns it, processes it as described above, and sets the next transmit pointer register 52 to point to transmit ring entry 32i. This process continues, with the host computer system 16 producing transmit buffers containing packets to the network adapter 10, and the network adapter 10 moving the transmit buffers into packet memory 27, for transmission on the network 12.

FIG. 3 shows the receive ring 60, a data structure in the host memory 22. The receive ring 60 contains a fixed number of receive ring entries 62a, 62b, ..., 62n (in this example, n=i). Each receive ring entry 62a through 62n includes an ownership bit 64, a receive buffer address field 66, a receive buffer length field 68, and a receive completion code field 70. A receive free pointer 72, and a receive fill pointer 74, exist in the host computer system 16. A next receive pointer register 76, exists in the receive consumer logic 26 in the network adapter 10.

For purposes of example, in FIG. 3, the receive free pointer 72 and the receive filled pointer 74, in the host computer system 16, point to receive ring entry 62b and receive ring entry 62h, respectively. The next receive pointer register 76 in the receive consumer logic 26 points to receive ring entry 62h. Receive ring entries with ownership bit equal to 1 (62h, 62i, and 62a), are owned by the network adapter 10. The receive buffer address fields of these three entries contain the addresses of receive buffers 78, 80, and 82 respectively. Those receive ring entries with ownership bit equal to 0 (62b, 62c, 62d, 62e, 62f, and 62g), are owned by the host computer system 16.

Prior to when the example begins, the host computer system 16 has produced three receive buffers, 78, 80, and 82, for the network adapter 10 to consume. The events occuring as the network adapter 10 consumes these buffers are as follows. The receive consumer logic 26 reads the ownership bit 64 in the receive ring entry pointed to by the next receive pointer register 76 (receive entry 62h), and determines the network adapter 10 owns the entry. Using the receive buffer address field 66 and receive buffer length field 68 to locate the receive buffer 78 in host memory 22, the receive consumer logic 26 moves a packet from packet memory 27 into the recieve buffer 78. When the data move completes, the receive consumer logic 26 writes the receive completion code 70, and changes the ownership of the receive ring entry 62h to 0. It then advances the next receive pointer register 76 to point to the next receive ring entry in sequence (62i). Receive ring entries 62i and 62a are then processed similarly. When processing of receive ring entries 62i and 62a is completed, the next receive pointer 76 points to receive entry 62b.

To produce another receive buffer for the network adapter 10 to consume, the host computer system 16 uses the receieve ring entry pointed to by the receive free pointer 72 (ring entry 62b). The host computer system 16 first writes the receive buffer address field 66 and the receive buffer length field 68 of the receive entry 62b with the address and length of a new recieve buffer. It then changes the ownership of receive ring entry 62b to 1. The receive consumer logic 26 reads the ownership bit 64 of the receive ring entry 62b, determines the network adapter 10 owns it, processes it as described above, and sets the next receive pointer to point to receive ring entry 62c. This process continues, with the host computer system 16 providing new receive buffers to the network adapter 10, and the receive consumer logic 26 moving data from the packet buffer 18 into the recieve buffers.

Figure 4:
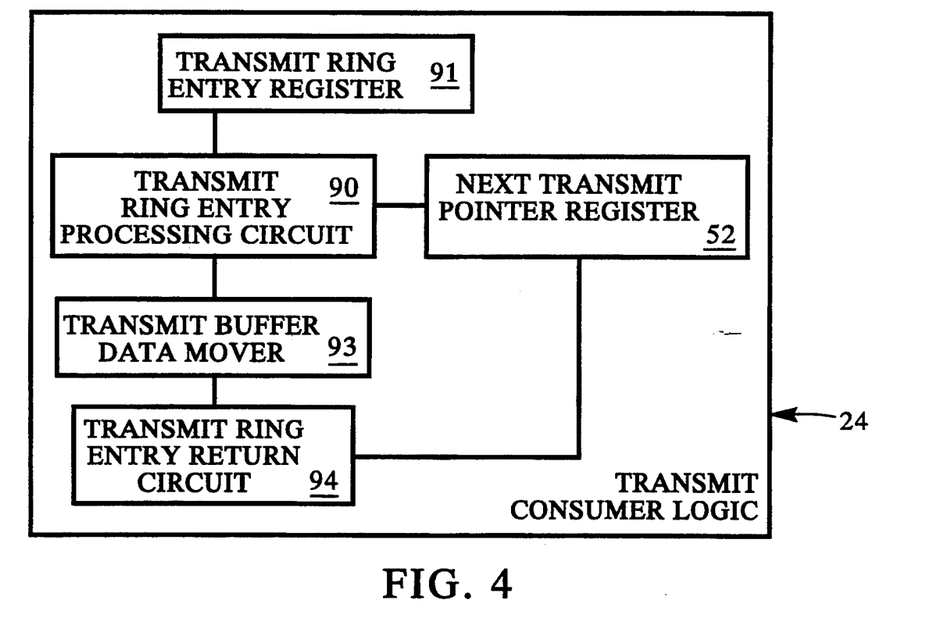
FIG. 4 is logic diagram of the elements within the transmit consumer logic in the network adapter.

In FIG. 4, there is shown the logical elements within transmit consumer logic 24. A transmit ring entry processing circuit 90 is coupled with a transmit ring entry register 91, the next transmit pointer register 52, and a transmit buffer data mover circuit 93. A transmit ring entry return circuit 94 is shown coupled with the transmit buffer data mover circuit 93 and the next transmit pointer register 52.

During operation, the transmit ring entry processing circuit 90 reads the transmit ring entry indicated by the address contained in the next transmit pointer register 52, into the transmit ring entry register 91. The transmit ring entry processing circuit 90 then determines if the ring entry is owned by the network adapter 10. If the ring entry is owned by the network adapter 10, the transmit ring entry processing circuit 90 outputs the contents of the transmit buffer address field 40 (see FIG. 2), and the transmit buffer length field 44 (see FIG. 2), to the transmit buffer data mover circuit 93. The transmit buffer data mover circuit 93 then moves the data contained in the transmit buffer indicated by the transmit buffer address and transmit buffer length output from the transmit ring entry processing circuit 90 from the host memory 18 into the packet memory 27. Following the data move, the transmit buffer data mover circuit 93 outputs a completion status to the transmit ring entry return means 94. The transmit ring entry return means 94 then writes the completion status output by the transmit buffer data mover circuit 93 to the transmit completion code field 46 in the transmit ring entry in the host memory 18, indicated by the address contained in the next transmit pointer register 52. The transmit ring entry return means 94 then changes the ownership of the transmit ring entry, indicated by the address contained in the next transmit pointer register 52, such that it is owned by the host computer system. The transmit ring entry return means 94 finally increments the contents of the next transmit pointer register 52 such that it contains the address of the next sequential transmit ring entry.

Figure 5:
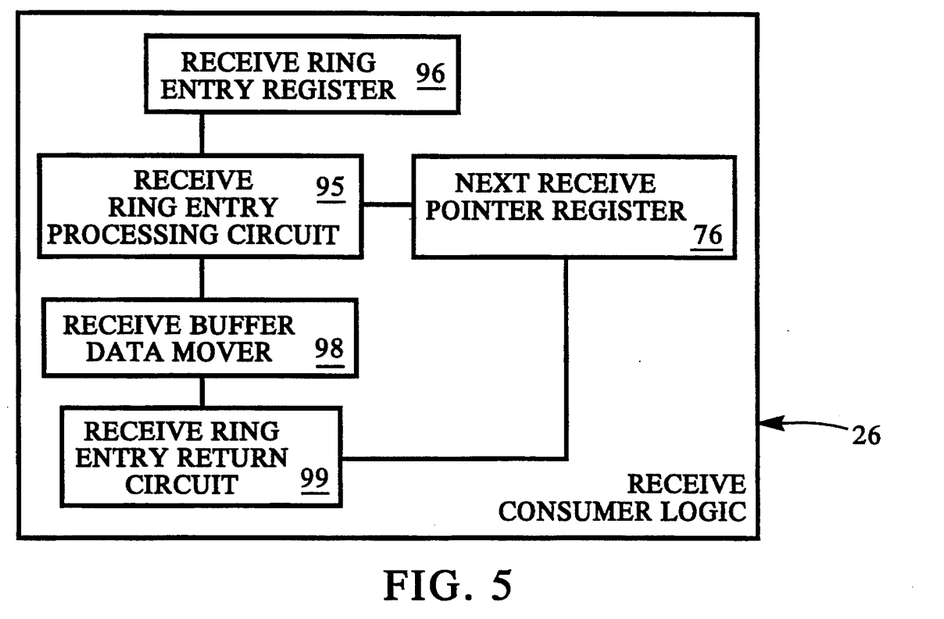
FIG. 5 is a logic diagram of the elements within the receive consumer logic in the network adapter.

In FIG. 5, there is shown the logical elements within receive consumer logic 26. A receive ring entry processing circuit 95 is coupled with a receive ring entry register 96, a next receive pointer register 76, and a receive buffer data mover circuit 98. A receive ring entry return circuit 99 is shown coupled with the receive buffer data mover circuit 98 and the next receive pointer register 76.

During operation, the receive ring entry processing circuit 95 reads the receive ring entry indicated by the address contained in the next receive pointer register 76, into the receive ring entry register 96. The receive ring entry processing circuit 95 then determines if the ring entry is owned by the network adapter 10. If the ring entry is owned by the network adapter 10, the receive ring entry processing circuit 95 outputs the contents of the receive buffer address field 66 (see FIG. 3), and the receive buffer length field 68 (see FIG. 3), to the receive buffer data mover circuit 98. The receive buffer data mover circuit 98 then moves packet data from the packet memory 27 (see FIG. 1) into the receive buffer indicated by the receive buffer address and receive buffer length output from the receive ring entry processing circuit 95. Following the data move, the receive buffer data mover circuit 98 outputs a completion status to the receive ring entry return means 99. The receive ring entry return means 99 then writes the completion status output by the receive buffer data mover circuit 99 to the receive ring entry in host memory indicated by the address contained in the next receive entry pointer register 76. The receive ring entry return means 99 then changes the ownership of the receive ring entry, indicated by the address contained in the next receive pointer register 76, such that it is owned by the host computer system, and increments the contents of the next receive entry pointer register 97 such that it contains the address of the next sequential transmit ring entry.

Figure 6:
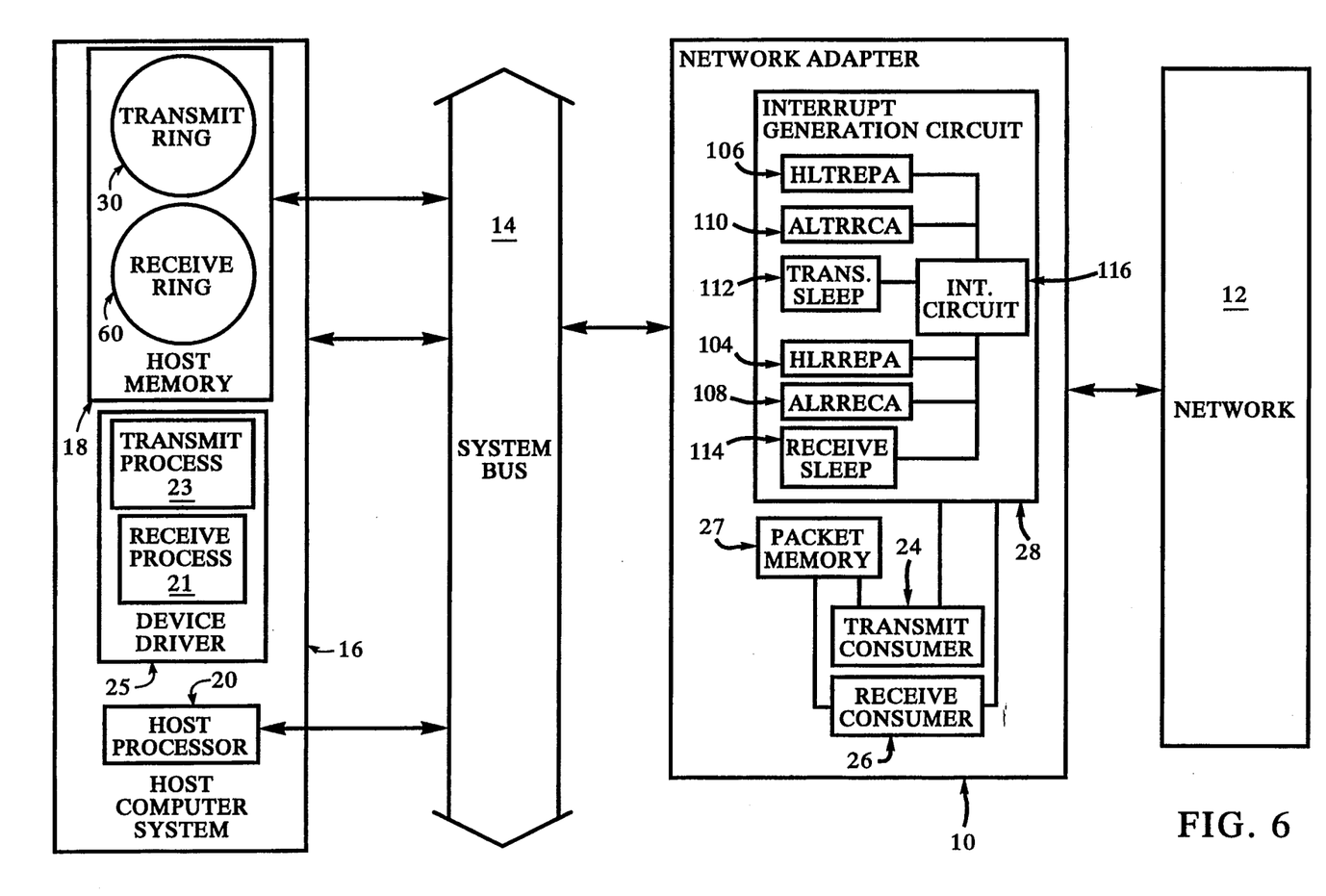
FIG. 6 is a diagram of a network adapter, showing the logic elements in the interrupt generation circuit, and a host computer system with a host processor and a host memory, showing the transmit and recieve rings in the host memory, a system bus, and a network.

In FIG. 6, there is shown a network adapter 10 as shown in FIG. 1, further showing logical elements within the interrupt generation circuit 28. The network adapter 10 is coupled to the network 12, and the system bus 14. The host computer system 16, is coupled to the system bus 14. The transmit ring 30 and receive ring 60 are shown in host memory 18. The device driver 25, having a transmit process 23 and a receive process 21, is shown in the host computer system 16. The receive consumer logic 26 and the transmit consumer logic 24 are coupled to the packet memory 27, and the interrupt generation logic 28. The interrupt generation circuit 28 comprises the following elements: a host-last-receive-ring-entry-processed-address register (HLRREPA register) 104; a host-last-transmit-ring-entry-processed-address register (HLTREPA register) 106; an adapter-last-receive-ring-entry-consumed-address register (ALRRECA register) 108; an adapter-last-transmit-ring-entry-consumed-address register (ALTRECA register) 110; a transmit sleep bit 112; a receive sleep bit 114; and an interrupt algorithm circuit 116. The HLRREPA register 104 and HLTREPA 106 are writable by the host computer system 16, and readable by the network adapter 10. The ALRRECA register 108 and the ALTRECA register 110 are readable and writable by the network adapter 10.

During operation, the host computer system 18 maintains the HLRREPA register 104 and HLTREPA register 106. When the host computer system 18 completes processing all receive buffers consumed by the network adapter 10, it enters the receive sleep state, and writes the address of the last receive ring entry it completed processing to the HLTRREPA register 104. A write to the HLTRREPA register 104 sets the receive sleep bit 114. Similarly, when the host computer system 16 completes processing all transmit buffers consumed by the network adapter 10, it enters the transmit sleep state, and writes the address of the last transmit ring entry it completed processing to the HLTREPA register 106. A write to HLTREPA sets the transmit sleep bit 112.

The ALRRECA register 108 and ALTRECA register 110 are maintained by the network adapter. As the receive consumer logic 26 consumes each receive buffer, it writes the address of the last receive ring entry it consumed to the ALECA register 108. Similarly, as the transmit consumer logic 24 consumes each transmit buffer, it writes the address of the last transmit ring entry consumed to the ALTRECA register 110.

The interrupt algorithm circuit 116 uses the contents of the HLRREPA register 104, the HLTREPA register 106, the ARLRECA register 108, and the ALTRECA register 110, and also the transmit sleep bit 112 and receive sleep bit 114, to determine when to generate an interrupt to the host processor 20. The interrupt algorithm circuit 116 generates a host interrupt when both transmit sleep bit 112 and receive sleep bit 114 are set, and either the contents of HLRREPA register 104 is not equal to the contents of ALRRECA register 108, or the contents of HLTREPA register 106 is not equal to the contents of ALTRECA register 110. When an interrupt is generated, the interrupt algorithm circuit 116 clears the transmit sleep bit 112 and the receive sleep bit 34.

Figure 7:
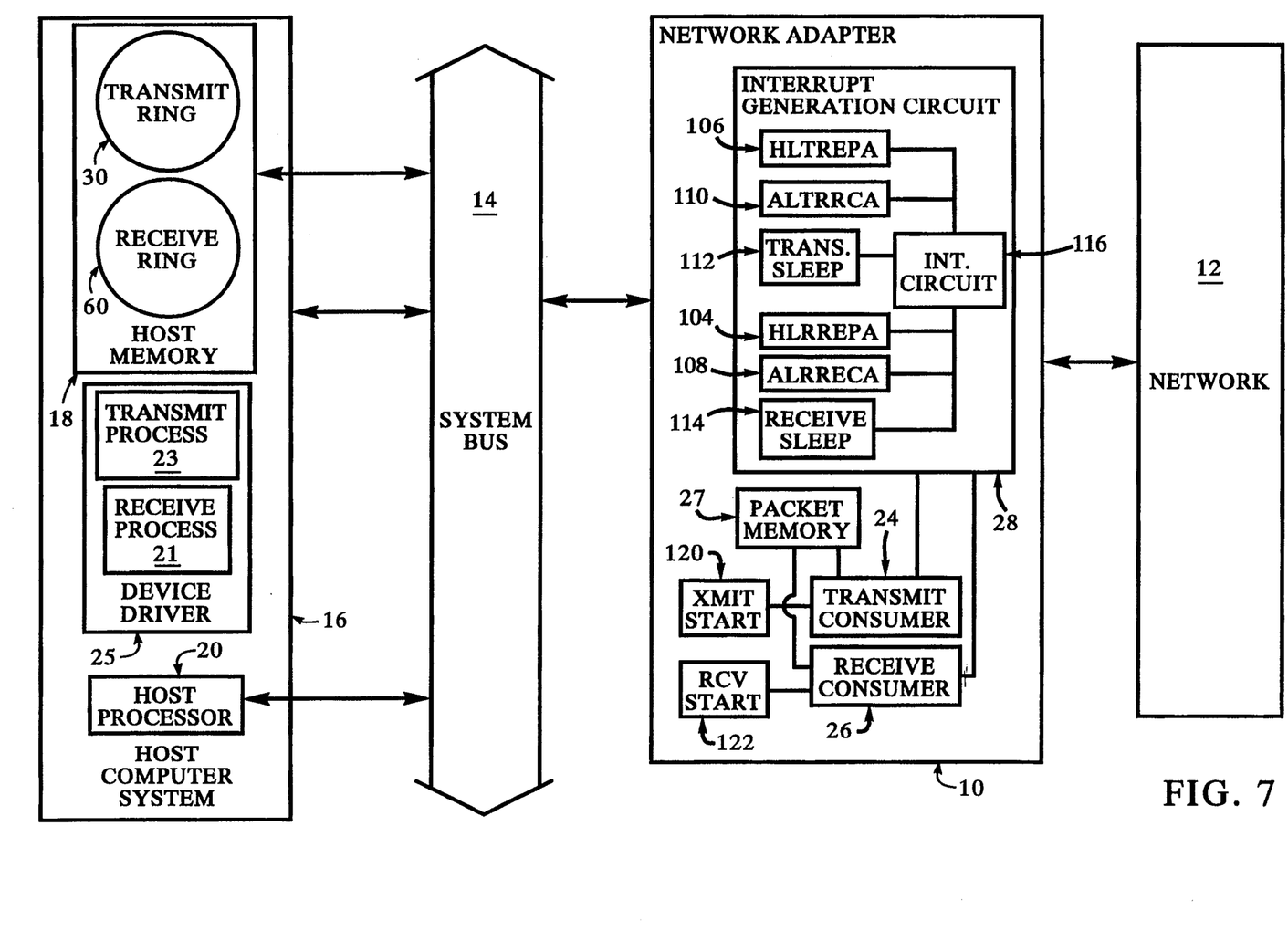
FIG. 7 is a diagram showing the elements in FIG. 4, as well as of the means of notification within the network adapter.

FIG. 7 shows the elements of the network adapter 10 shown in FIG. 6, also showing logical elements allowing the host computer system 16 to notify the network adapter 10 that it has produced one or more host memory buffers for the network adapter 10 to consume. A transmit start bit 120, and a receive start bit 122 are shown, coupled with transmit consumer logic 24, and receive consumer logic 26, respectively. Both transmit start bit 120 and receive start bit 122 are writable by the host computer system 16.

During operation, when the host computer system 16 has produced one or more host memory receive buffers, it will set the recieve start bit 122. The receive consumer logic 26 detects that the receive start bit 122 has been set, and consumes all receive buffers that are owned by the network adapter 10 on the receive ring 60. The receive consumer logic 26 then clears the receive start bit 122. Similarly, when the host computer system 16 has produced a single or multiple host memory transmit buffers, it sets the transmit start bit 120. The transmit consumer logic 24 detects that the transmit start bit 120 has been set, and consumes all transmit buffers that are owned by the network adapter 10 on the transmit ring 30. The transmit consumer logic 24 then clears the transmit start bit 120.

What is claimed is:

1. A network adapter to interface between a network and a host computer system, said host computer system having a host memory, one or more transmit buffers within said host memory, and one or more receive buffers within said host memory, said host computer system further having a device driver that enters a transmit sleep state when all said transmit buffers are full for transmitting packets, and that enters a receive sleep state when all said receive buffers are empty for receiving packets, said host memory further having a transmit ring and a receive ring, said transmit ring being a circular data structure having entries and each said entry having an ownership bit and an address pointing to a one of said one or more transmit buffers said receive ring being a circular data structure having entries and each said entry having an ownership bit and an address pointing to a one of said one or more receive buffers, comprising:

means for detecting if said device driver is in said transmit sleep state;

means for detecting if said device driver is in said receive sleep state;

a transmit consumer means, having,
a first register to receive one of said entries on said transmit ring, and
a means for reading a transmit ring entry from said host memory into said first register and determining whether said transmit ring entry is owned by said network adapter;

a receive consumer means, having,
a second register to receive a receive ring entry having an ownership bit, and
a means for reading a receive ring entry from said host memory into said second register and determining whether said receive ring entry is owned by said network adapter; and means for interrupting said host computer system in the event that said device driver is in both said transmit sleep state and said receive sleep state and a one of said one or more receive buffers is available for said device driver, said one or more receive buffers available for said device driver containing data received from said network by said network adapter.

2. The network adapter as in claim 1 further comprising:

a host last receive ring entry processed register (HLRREP register) holding an address of a first receive ring entry, said first receive ring entry indicating a last receive buffer processed by said device driver;

an adapter last receive ring entry consumed register (ALRREC register) holding an address of a second receive ring entry, said second receive ring entry indicating a last receive buffer consumed by said network adapter; and said means for interrupting said host computer system detecting that a one of said one or more receive buffers is available for said device driver when said HLRREP register is unequal to said ALRREC register.

3. The network adapter as in claim 2 further comprising:

a host last transmit ring entry processed register (HLTREP register) holding an address of a first transmit ring entry, said first transmit ring entry indicating a last transmit buffer processed by said device driver;

an adapter last transmit ring entry consumed register (ALTREC register) holding an address of a second transmit ring entry, said second transmit ring entry indicating a last transmit buffer consumed by said network adapter;

said means for interrupting said host computer system also interrupting said host computer system in the event that said device driver is in both said transmit sleep state and said receive sleep state and a one of said one or more transmit buffers is available for said device driver, said one or more transmit buffers available for said device driver containing data having been completely transmitted onto said network by said network adapter; and said means for interrupting said host computer system detecting that a one of said one or more transmit buffers is available for said device driver when said HLTREP register is unequal to said ALTREC register.

4. A station for a network comprising:

a) a host computer system, said host computer having a memory, one or more transmit buffers in said memory, one or more receive buffers within said memory, said host computer system further having a device driver that enters a transmit sleep state when all said transmit buffers are full for transmitting packets, and that enters a receive sleep state when all said receive buffers are empty for receiving packets, said device driver processing data in said receive buffers when said device driver is not in said receive sleep state, said host memory also having a transmit ring and a receive ring, said receive ring being a circular data structure having entries and each said entry having an address pointing to a one of said one or more receive buffers;

b) an ownership bit in each said entry in said transmit ring;

c) an ownership bit in each said entry in said receive ring;

d) a network adapter to interface between said host computer system and a network, said network adapter transferring data received from said network into said receive buffers;
e) means within said network adapter for detecting if said device driver is in said transmit sleep state;
f) means within said network adapter for detecting if said device driver is in said receive sleep state;
g) means within said network adapter for interrupting said host computer system in the event that said device driver is in both said transmit sleep state and said receive sleep state and one of said receive buffers contains data for said device driver;
h) a first register within said network adapter to receive a transmit ring entry having an ownership bit;
i) a means within said network adapter for reading a transmit ring entry from host memory into said first register and determining whether said transmit ring entry is owned by said network adapter;
j) a second register within said network adapter to receive a receive ring entry having an ownership bit;
k) a means within said network adapter for reading a receive ring entry from host memory into said second register and determining whether said receive ring entry is owned by said network adapter;
l) means within said device driver for reading a transmit ring entry having a transmit ownership bit set to indicate host computer system ownership of said transmit ring entry; and
m) means within said device driver for reading a receive ring entry having a receive ownership bit set to indicate host computer system ownership of said receive ring entry.

5. A network adapter for data transfer between a host computer system and a network, wherein said host computer system includes a host processor and a host memory, wherein said host memory includes a plurality of memory buffers, wherein said memory buffers include transmit buffers containing packets to be transmitted onto said network, wherein said host memory includes a transmit ring, wherein said transmit ring consists of a fixed number of transmit ring entries, wherein each said transmit ring entry includes an ownership bit, a transmit buffer pointer, and a transmit buffer length, wherein said memory buffers include receive buffers to hold packets received from said network adapter, wherein said host memory includes a receive ring, wherein said receive ring consists of a fixed number of receive ring entries, wherein each said receive ring entry includes an ownership bit, a receive buffer pointer, and a receive buffer length, wherein said host computer system operates said network adapter with a device driver, wherein said device driver has a sleep state and an active state, wherein said device driver enters said active state when said host computer system receives an interrupt from said network adapter, and wherein said device driver enters said sleep state when it has processed all entries owned by said host computer system in said transmit ring and in said receive ring, comprising:

A. a packet memory for storing packets received from and to be transmitted to said network;
B. a transmit buffer consumer means, having,
  a next transmit pointer register,
  a transmit ring entry processing means, responsive to said next transmit pointer register, for reading a transmit ring entry whose address is contained in said next transmit pointer register, determining the ownership of said transmit ring entry, and if said transmit ring entry is owned by said network adapter, generating an output equal to the transmit buffer pointer and transmit buffer length from said transmit ring entry,
  a transmit buffer data mover means, responsive to said output generated by transmit ring entry processing means, for moving the packet contained in the transmit buffer indicated by said transmit buffer pointer and transmit buffer length from said host memory into said packet memory, and generating a completion status, and
  a transmit ring entry return means, responsive to said completion status generated by said transmit buffer data mover means, for writing said completion status to said transmit ring entry, changing the ownership of said transmit ring entry so that the host computer system owns said transmit ring entry, generating an output equal to the current value of the next transmit pointer, and incrementing said next transmit pointer register to contain the address of the next sequential transmit ring entry in the transmit ring;
C. a receive buffer consumer means, having,
  a next receive pointer register,
  a receive ring entry processing means, responsive to said next receive pointer register, for reading a receive ring entry whose address is contained in said next receive pointer, determining the ownership of said receive ring entry, and if said receive ring entry is owned by said network adapter, generating an output equal to the receive buffer pointer and receive buffer length from said receive ring entry,
  a receive buffer data mover means, responsive to said output generated by said receive ring entry processing means, for moving a packet contained in packet memory to the receive buffer indicated by said receive buffer pointer and receive buffer length, and generating a completion status, and
  a receive ring entry return means, responsive to said completion status generated by said receive buffer data mover means, for writing said completion status to said receive ring entry, changing the ownership of said receive ring entry so that the host computer system owns said receive ring entry, generating an output equal to the current value of the next receive pointer, and incrementing said next receive pointer register to contain the address of the next sequential receive ring entry in the receive ring; and
D. an interrupt generation means, responsive to said receive ring entry return means, said transmit ring entry return means, and said host computer system, for issuing interrupts to said host computer system only when said device driver is in said sleep state, said interrupt generation means further including
  a host last transmit ring entry processed register, writable by said host computer system,
  a host last receive ring entry processed register, writable by said host computer system,
  a transmit sleep bit, set responsive to said host last transmit ring entry processed register being written by said host computer system, and cleared by said network adapter,
  a receive sleep bit, set responsive to said host last receive ring entry processed register being written by said host computer system, and cleared by said network adapter, an adapter last transmit ring entry consumed register, responsive to said transmit ring entry return means, for holding an address of a last transmit ring entry consumed by said network adapter, an adapter last receive ring entry consumed register, responsive to said receive ring entry return means, for holding an address of a last receive ring entry consumed by said network adapter, and an interrupt logic means, responsive to said transmit sleep bit, said receive sleep bit, said host last receive ring entry processed register, said host last transmit ring entry processed register, said adapter last transmit ring entry processed address register, and said adapter last receive ring entry consumed register, for generating an interrupt to said host computer system when said host transmit sleep bit and said host receive sleep bit are both set, and either said host last transmit ring entry processed register does not equal said adapter last transmit ring entry consumed register or said host last receive ring entry processed register does not equal said adapter last receive ring entry consumed register, and for clearing said transmit sleep bit and said receive sleep bit when said interrupt is generated.

6. The network adapter as in claim 5, wherein said receive buffer consumer means further comprises:
a start receive bit, settable by said host computer system, and clearable by said network adapter, indicating when set that said host computer system has produced one or more receive buffers for the network adapter to consume.

7. The network adapter as in claim 6, wherein said transmit buffer consumer means further comprises:
a start transmit bit, settable by said host computer system, and clearable by said network adapter, indicating when set that said host computer system has produced one or more transmit buffers for the network adapter to consume.

8. The network adapter as in claim 7 wherein said transmit buffer consumer means is further responsive to said start transmit bit being set.

9. The network adapter as in claim 8 wherein said transmit buffer consumer means processes all transmit ring entries owned by said network adapter and then clears said start transmit bit.

10. The network adapter as in claim 9 wherein said receive buffer consumer means is further responsive to said start receive bit being set.

11. The network adapter as in claim 10 wherein said receive buffer consumer means processes all receive ring entries owned by said network adapter, and then clears said start receive bit.

12. A network adapter, for connecting a host computer system with a computer network, said host computer system having a host memory, one or more transmit buffers within said host memory, and one or more receive buffers within said host memory, said host computer system further having a device driver that enters a transmit sleep state when all said transmit buffers are full for transmitting packets, and that enters a receive sleep state when all said receive buffers are empty for receiving packets, comprising:
means for detecting if a device driver in said host computer system is in a transmit sleep state, said detecting means includes a transmit sleep bit, said device driver processing data transmitted onto said computer network when said device driver is not in said transmit sleep state;

means for detecting if said device driver is in a receive sleep state, said detecting means includes a receive sleep bit, said device driver processing data received from said computer network when said device driver is not in said receive sleep state; and means for interrupting said host computer system in the event that said device driver is in both said transmit sleep state and said receive sleep state and said network adapter writes a packet received by said network adapter into a memory in said host computer system, wherein said means for interrupting said host computer system further comprises:

a host last receive register, responsive to write operations generated by said host computer system, for holding a first host memory address representing a last receive buffer in said host memory processed by said host computer system;

a network adapter last receive register, maintained by said network adapter, for holding a second host memory address representing a last receive buffer in said host memory processed by said network adapter; and means for generating an interrupt to said host computer system when both said transmit sleep bit and said receive sleep bit are set, and the contents of said host last receive register is not equal to the contents of said network adapter last receive register.

13. The network adapter as in claim 12, wherein said means for detecting if a device driver in said host computer system is in a transmit sleep state includes a transmit sleep bit, responsive to write operations generated by said host computer system, indicating when set by said host computer system that said device driver is in said transmit sleep state.

14. The network adapter as in claim 13, wherein said means for detecting if said device driver is in a receive sleep state includes a receive sleep bit, responsive to write operations generated by said host computer system, indicating when set by said host computer system that said device driver is in said receive sleep state.

15. The network adapter as in claim 14, wherein said means for interrupting said host computer system further comprises:
a host last transmit register, responsive to said host computer system, for holding a third host memory address representing a last transmit buffer in said host memory processed by said host computer system;

a network adapter last transmit register, for holding a fourth host memory address representing a last transmit buffer in said host memory processed by said network adapter; and means for generating an interrupt to said host computer system when both said transmit sleep bit and said receive sleep bit are set, and the contents of said host last transmit register is not equal to the contents of said network adapter last transmit register.

16. A system for generating interrupts to a host computer system from a network adapter, said network adapter coupled with said host computer system, wherein said host computer system includes a host processor and a host memory, wherein said host memory includes a plurality of memory buffers, wherein said memory buffers include transmit buffers containing packets to be transmitted onto said network, wherein said host memory includes a transmit ring, wherein said transmit ring consists of a fixed number of transmit ring entries, wherein each said transmit ring entry includes an ownership bit, a transmit buffer pointer, and a transmit buffer length, wherein said memory buffers include receive buffers to hold packets received from said network adapter, wherein said host memory includes a receive ring, wherein said receive ring consists of a fixed number of receive ring entries, wherein each said receive ring entry includes an ownership bit, a receive buffer pointer, and a receive buffer length, wherein said host computer system operates said network adapter with a device driver, wherein said device driver has a sleep state and an active state, wherein said device driver enters said active state when said host computer system receives an interrupt from said network adapter, and wherein said device driver enters said sleep state when it has processed all entries owned by said host computer system in said transmit ring and in said receive ring, comprising:

- a host last transmit ring entry processed register, writable by said host computer system, for storing an address of a transmit ring entry most recently processed by said device driver;
- a host last receive ring entry processed register, writable by said host computer system, for storing an address of a receive ring entry most recently processed by said device driver;
- a transmit sleep bit, set responsive to said host last transmit ring entry processed register being written by said host computer system;
- a receive sleep bit, set responsive to said host last receive ring entry processed register being written by said host computer system;
- an adapter last transmit ring entry consumed register, for holding an address of a last transmit ring entry consumed by said network adapter;
- an adapter last receive ring entry consumed register, for holding an address of a last receive ring entry consumed by said network adapter; and
- an interrupt logic means, responsive to said transmit sleep bit, said receive sleep bit, said host last receive ring entry processed register, said host last transmit ring entry processed register, said adapter last transmit ring entry processed address register, and said adapter last receive ring entry consumed register, for generating an interrupt to said host computer system when both said host transmit sleep bit and said host receive sleep bit are set, and said host last transmit ring entry processed address register does not equal said adapter last transmit ring entry consumed address register.

17. The system of claim 16, wherein said interrupt logic means further generates an interrupt to said host computer system when said host transmit sleep bit and said host receive sleep bit are both set, and said host last receive ring entry processed address register does not equal said adapter last receive ring entry consumed address register.

18. The system of claim 16, wherein said interrupt logic means clears said host transmit sleep bit and said host receive sleep bit when said interrupt is generated.

* * * * *